United States Patent [19]
Georges et al.

[11] Patent Number: 5,335,107
[45] Date of Patent: Aug. 2, 1994

[54] METHOD AND APPARATUS FOR MODULATION OF SELF-PULSATING DIODE LASER'S SELF-PULSATING FREQUENCY

[75] Inventors: John B. Georges, Berkeley; Kam Y. Lau, Danville, both of Calif.

[73] Assignee: Regents of the University of California, Oakland, Calif.

[21] Appl. No.: 891,551

[22] Filed: May 29, 1992

[51] Int. Cl.[5] .......................................... H04B 10/04
[52] U.S. Cl. .................................. 359/181; 359/182; 359/184; 372/38; 372/26
[58] Field of Search ................ 359/181, 182, 184–185, 359/188, 195, 118, 132; 372/26, 28, 38, 82

[56] References Cited

U.S. PATENT DOCUMENTS

| | | | |
|---|---|---|---|
| 4,561,119 | 12/1985 | Epworth | 359/181 |
| 4,953,156 | 8/1990 | Olshansky et al. | 359/132 |
| 4,965,857 | 10/1990 | Auracher et al. | 359/181 |
| 5,025,487 | 6/1991 | Eichen | 359/182 |
| 5,136,264 | 8/1992 | Nardozza | 359/181 |

OTHER PUBLICATIONS

Bates et al. "450 Mbit/s BPSK and 1/Gbit/s QPSK throughput subcarrier multiple-access networks using 790 nm selfpulsating laser transmitter network for computer applications", Electronics Letters, Jun. 6, 1991 vol. 27, No. 12, pp. 1014–1016.

Primary Examiner—Richard E. Chilcot, Jr.
Assistant Examiner—K. Negash
Attorney, Agent, or Firm—Ware and Gray Carey Freidenrich

[57] ABSTRACT

Disclosed is an optical communication system which uses the self-pulsating frequency of a self-pulsating laser diode as a microwave subcarrier to transmit digital information. The system has a transmitter comprising a self-pulsating laser diode and a modulating mechanism for encoding the laser's self-pulsating microwave sub-carrier. In one embodiment, the modulating mechanism employs frequency-shift keying for digitally encoding the sub-carrier. Furthermore, the optical communication system has a receiver including a photodetector and a signal decoder.

13 Claims, 5 Drawing Sheets

METHOD AND APPARATUS FOR MODULATION OF SELF-PULSATING DIODE LASER'S SELF-PULSATING FREQUENCY

FIELD OF THE INVENTION

The present invention relates to optical communication systems. More specifically, it relates to an optical communication system which includes a transmitter that modulates the self-pulsating frequency of a self-pulsating laser diode.

BACKGROUND OF THE INVENTION

Local area networks consisting of a number of personal computers, utilize electronic means, including wire connections to transmit information from one station to another. While transmission of data through optical fibers is preferable to electronic transmissions, optical communication systems (OCS) are presently too costly to Justify their use in local area networks. The cost is prohibitive because the lasers and the modulation hardware used in these systems is expensive.

The transmission of data through fiber-optic cables is preferable because they can transmit signals with a bandwidth of several gigahertz over distances of several of tens or hundreds of kilometers (depending on the power of the signal) with losses of fractional decibels per kilometer. Compared with coaxial cables, which are dispersive (different frequencies travel at different speeds, and with different amounts of loss, thereby corrupting waveforms), fiber-optic cables can be designed so that dispersion is negligible. Also, unlike ordinary cables, they do not act as antennas for radio interference or impulsive noise. They are lighter, safer, and more rugged than conventional cables, and they are potentially less expensive.

Prior transmitters used in OCSs, have not included the self-pulsating laser diodes (SPLD) because it does not generate a signal of sufficient power for use in long-distance OCSs. Moreover, the SPLD generates both an optical frequency and a self-pulsating sub-carrier frequency, the latter of which has been considered detrimental to SPLD's performance. Many researchers have concentrated their efforts on removing, or working around the self-pulsating frequency. The lasers used in prior art OCSs do not generate the self-pulsation.

OBJECTS AND SUMMARY OF THE INVENTION

It is therefore a general object of the present invention to provide an optical communication system for local area networks.

It is another object of the present invention to provide an optical communication system which utilizes a SPLD as part of the transmitter.

It is a further object to provide an optical communication system which is low cost, uses commercially available components and is simple to implement.

It is yet another object to provide an optical communication system which is compact, for example, fits on a circuit board made for personal computers.

It is still a further object of the present invention to provide an optical communication system which is high speed, for example, runs at 1 gigabit/sec and is flexible so that it may run from 10 megabits to 1 gigabit with small modifications.

It is still another object to provide an optical communication system which uses a format presently used in modems and facsimile.

Finally, it is yet a further object of the present invention to provide an optical communication system which is adaptable to different types of local area networks and can support various numbers of users with small modifications.

The foregoing and other objects of the invention are achieved by an OSC which applies modulation techniques to the self-pulsating microwave sub-carrier of a SPLD. The system has a transmitter comprising a SPLD and a modulating mechanism for encoding data onto the laser's self-pulsating microwave sub-carrier. In one embodiment, the modulating mechanism employs frequency-shift keying (FSK) for digitally encoding the self-pulsating sub-carrier. Furthermore, the OSC has a receiver including a discrimination mechanism decoding the light signal.

BRIEF DESCRIPTION OF THE DRAWINGS

Other objects, and many of the intended advantages of the present invention, will be readily appreciated as the same becomes better understood by reference to the following detailed description when considered in connection with the accompanying drawings wherein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the claims.

Figure 1:
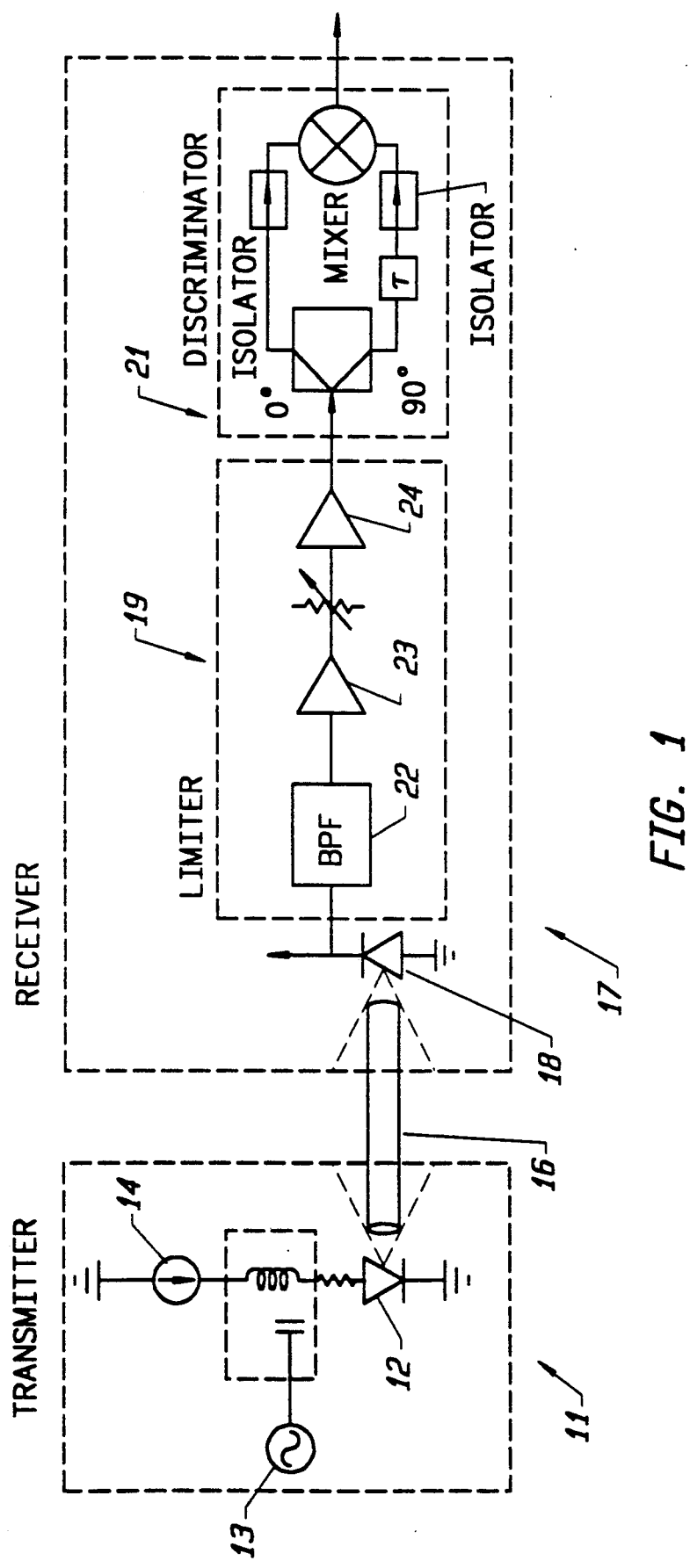
FIG. 1 depicts the optical and electrical components of the present invention.

Attention is drawn to FIG. 1 which depicts the optical and electrical components of the present invention. The transmitter 11, an electrical-to-optical converter, includes a SPLD 12, and a modulator mechanism 13. SPLD 12, for example, is a Sharp LT022MC, multimode, compact disc, SPLD emitting at 780 nm. As stated above, the SPLD generates both an optical carrier frequency and a self-pulsating sub-carrier frequency. An SPLD's optical carrier's characteristic frequency is on the order of 780 nm. The unmodulated self-pulsating microwave sub-carrier frequency riding on top of the optical carrier frequency has a much lower frequency which is on the order of 1-5 G hertz.

Ordinarily, OCSs modulate a carrier (source) frequency by FSK. (FSK may be thought of as digital FM). While the modulation of the carrier frequency requires expensive microwave local oscillators, modulators and demodulators to transmit data, it attains a maximum bit rate of only 200 Mb/s.

In the present invention, however, an SPLD's self-pulsating sub-carrier frequency is FSK modulated and is capable of transmitting data as fast as 1 Gb/s. Moreover, the present invention further encompasses the modulation of the self-pulsating sub-carrier frequency of a SPLD by any modulating techniques, including amplitude modulation and phase modulation.

In the present invention, modulation of the sub-carrier by FSK is preferable because modems and facsimiles communicate in FSK. To demodulate FSK, a commercially available discriminators are used to recover the data.

Turning to FIG. 1, the transmitter 11, an electrical-to-optical converter, has a SPLD 12 and a modulation mechanism 13 for the modulation of the SPLD's self-pulsating sub-carrier frequency. The modulation mechanism 13 modulates the current from current source 14 thereby changing the frequency of the self-pulsation frequency. Such FSK modulation is effected, for example, by a bit-error-rate test set (BERT set). Accordingly, the prior art OSC's need for a microwave local oscillator is eliminated.

The laser output is coupled to the receiver 16 by an optical fiber 16. The receiver 17, an optical-to-electrical converter, includes a p-i-n diode 18. The signal from diode 18 is passed through a filter 22, an amplifier 23 and a limiter and is presented as input to the discriminator 21.

As illustrated by FIG. 1, the signal passes through a band-pass filter 22 to reduce noise and then is pre-amplified 23 because the SPLD is low power. The signal then passes through a limiting amplifier 24 to remove any amplitude modulation to within $+1.5$ dB. The signal is then presented by the limiter 19 to a discriminator 21 for decoding.

Figure 2:
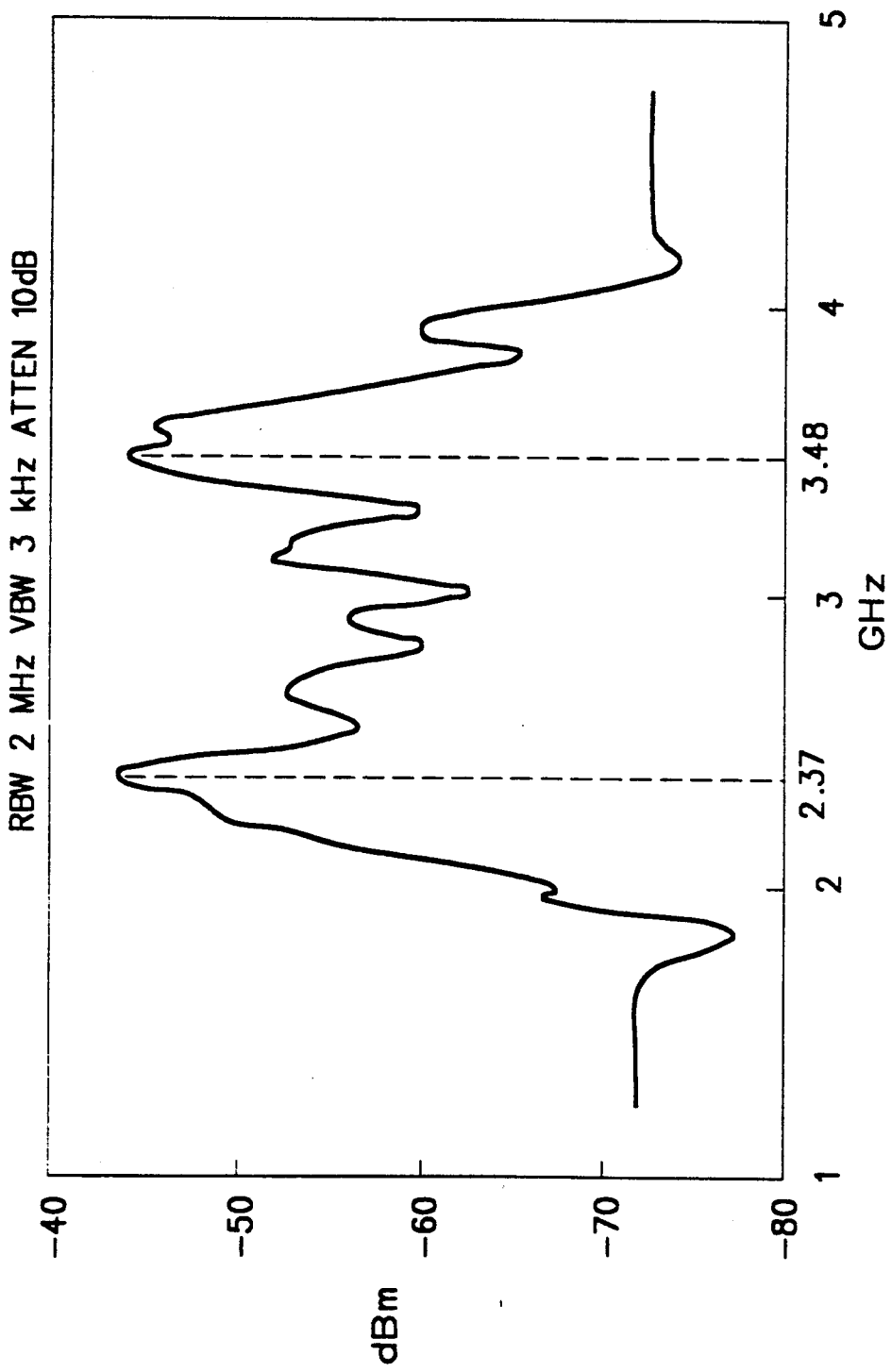
FIG. 2 is a graph showing the frequencies designated as 0's and 1's of the FSK power spectrum in power.

FIG. 2 is a graph showing the FSK power spectrum represented as power as a function of the self-pulsating sub-carrier frequency modulated by FSK. In this scheme, a first frequency representative of a binary zero is at 2.37 GHz, and a second frequency representative of a binary one is at 3.48 GHz.

Figure 3A:
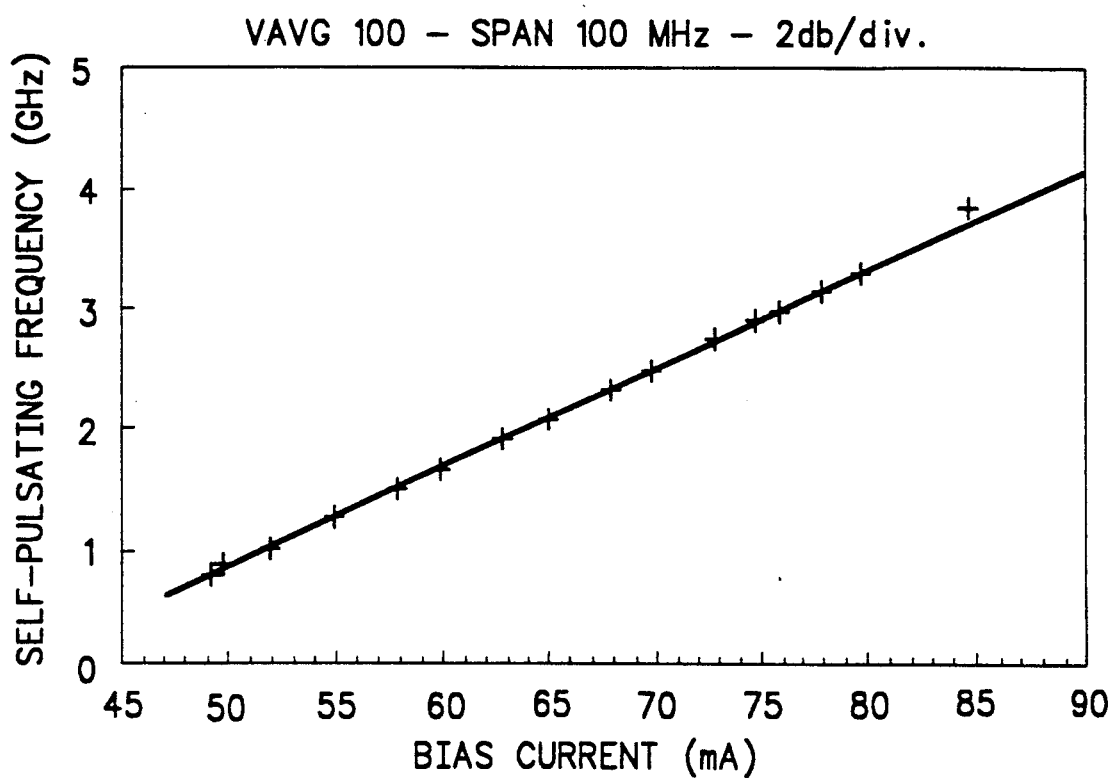
FIGS. 3(A)-3(B) are a graph of self-pulsating microwave sub-carrier frequency driving current verses the self-pulsating microwave sub-carrier frequency.
Figure 3B:
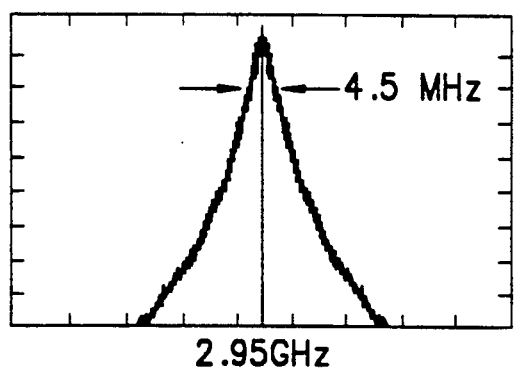

FIG. 3 is a graph of self-pulsating microwave sub-carrier frequency driving current verses the self-pulsating microwave sub-carrier frequency. Shown in the inset is the microwave spectrum of the self-pulsating tone at $I_{dc}=78$ mA, where $I_{dc}$ is the d.c. bias current. The tunability and coding flexibility of the SPLD is illustrated by SPLD's frequency response to a changing current.

Figure 4:
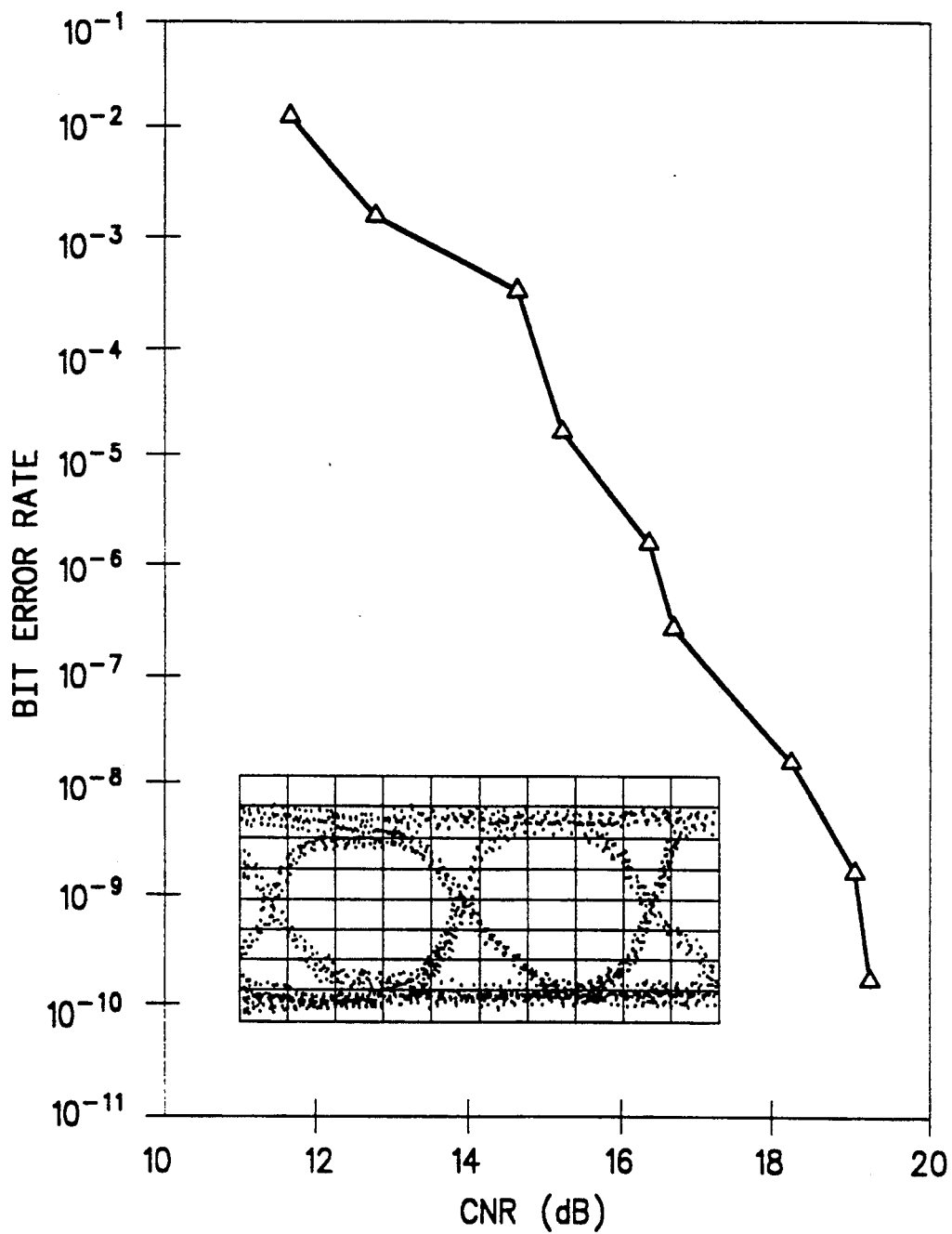
FIG. 4 is a graph of the carrier-to-noise ratio verses the bit-error-rate.

FIG. 4 is a graph of the carrier-to-noise (CNR) ratio verses the bit-error-rate, where CNR was measured after the preamplifier. The CNR values are comparable to previously reported results for 200 Mb/s FSK using conventional microwave local oscillators.

Figure 5:
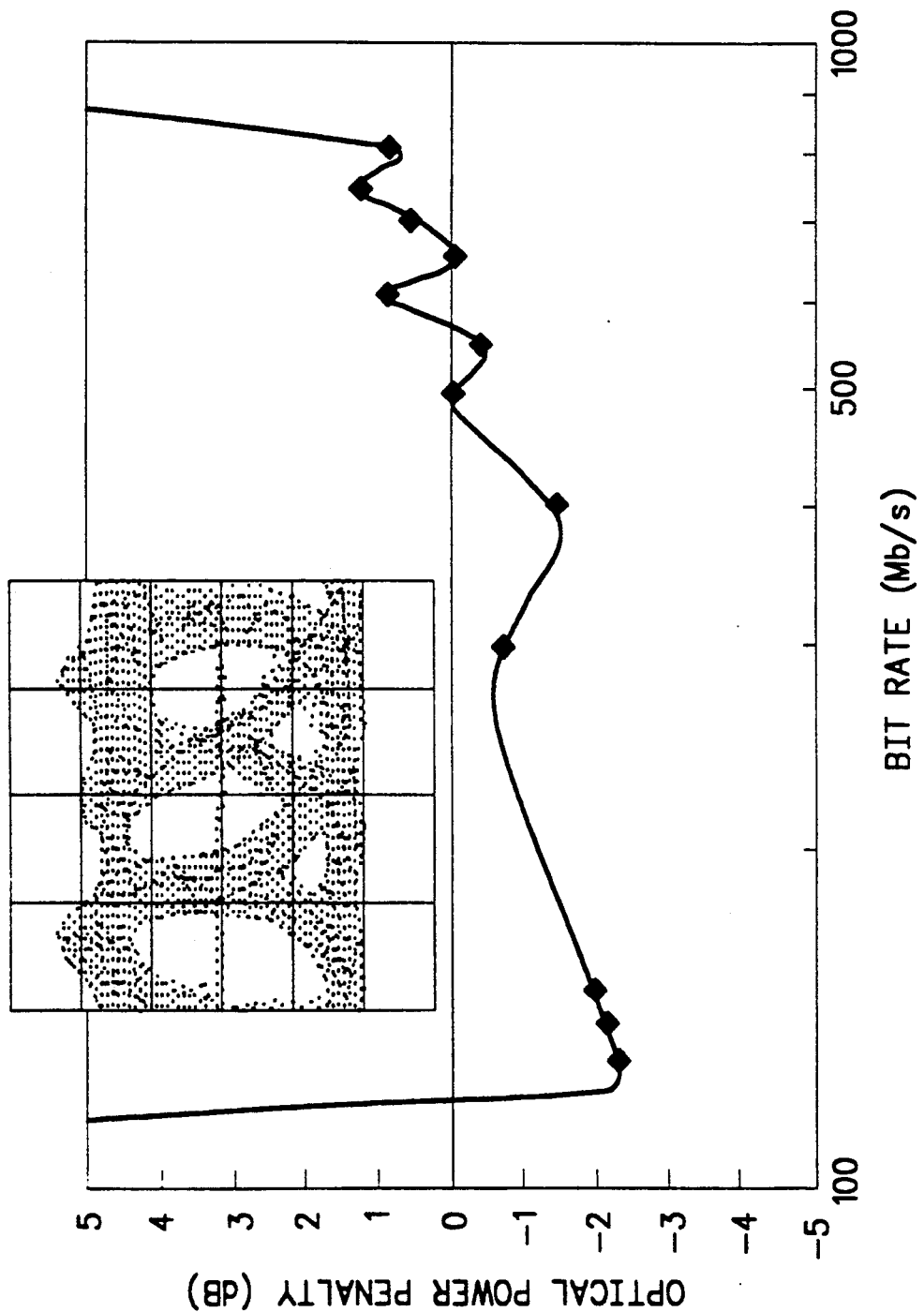
FIG. 5 is a graph of the bit rate verses the optical power penalty (as compared to 500 Mb/s).

FIG. 5 is a graph of the bit rate verses the optical power penalty. FIG. 5 illustrates the optical power penalty incurred at various bit-rates (as compared to 500 Mb/s), while maintaining a bit error ratio of only 1 out of a billion. The inset shows the eye diagram at 800 Mb/s. Because the present invention is flexible, with small modifications, the system runs from 10 megabits to 1 gigabit.

Clearly, the general object of the present invention to provide an OSC for local area networks has been met. Advantageously, the present invention can be configured to fit on a circuit board made for personal computers and is adaptable to different types of local area networks which support various numbers of users with small modifications. While the present invention has been described with respect to local area computer networks, it is also useful for telephone systems and any other system requiring local transmission of data.

While the present invention has been shown and described in what is presently conceived to be the most practical and preferred embodiment of the invention, it will become apparent to those of ordinary skill in the art that many modifications thereof may be made within the scope of the invention, which scope is to be accorded the broadest interpretation of the claims so as to encompass all equivalent structures.

We claim:

1. A system for optical communications, comprising:
    a transmitter comprising a self-pulsating laser diode for generating a light signal comprising an optical carrier and a self-pulsating microwave sub-carrier;
    modulating means for modulating said self-pulsating microwave sub-carrier generated by said transmitter so as to generate a modulated microwave sub-carrier light signal; and
    a receiver comprising a photodetector for receiving said modulated microwave sub-carrier light signal and a decoder for decoding said modulated microwave sub-carrier light signal.

2. A system as recited in claim 1 wherein said modulating means modulates the frequency of said self-pulsating microwave sub-carrier.

3. A system as recited in claim 2 wherein said modulating means modulates said self-pulsating microwave sub-carrier by frequency-shift keying.

4. A system as recited in claim 1 wherein said optical communications are digital.

5. A system as recited in claim 1 wherein said photodetector is a p-i-n diode.

6. A system as recited in claim 1 wherein said modulating means modulates said self-pulsating microwave subcarrier between two frequencies, a first frequency representative of a one, and a second frequency representative of a zero.

7. A system as recited in claim 6 wherein said decoder converts said first frequency into a one and said second frequency into a zero.

8. A system as recited in claim 7 wherein said decoder is a discriminator.

9. A system of optical communications, comprising:
    a transmitter comprising a SPLD for generating a light signal comprising an optical carrier and a self-pulsating microwave sub-carrier;
    modulating means for frequency-shift keying said self-pulsating microwave sub-carrier generated by said transmitter so as to generate a modulated microwave sub-carrier light signal;
    a receiver comprising a photodetector for receiving said modulated microwave sub-carrier light signal and decoding said modulated microwave sub-carrier light signal.

10. A system as recited in claim 9 wherein said photodetector is a p-i-n diode.

11. A system as recited in claim 9 wherein said decoder is a frequency discriminator.

12. A method utilizing a SPLD for providing optical communications, comprising the steps of:
    transmitting a light signal comprising an optical carrier and a self-pulsating microwave sub-carrier;

modulating said self-pulsating microwave sub-carrier of said light signal transmitted in said transmitting step so as to generate a modulated micro-wave sub-carrier light signal;

receiving said modulated microwave sub-carrier light signal; and decoding said modulated microwave sub-carrier light signal.

13. A method utilizing a SPLD for providing optical communications, comprising the steps of:

transmitting a light signal comprising an optical carrier and a self-pulsating microwave sub-carrier;

frequency-shift keying said self-pulsating microwave sub-carrier of said light signal transmitted in said transmitting step so as to generate a modulated microwave sub-carrier light signal;

receiving said modulated microwave sub-carrier light signal; and decoding said modulated microwave sub-carrier light signal.

* * * * *